US012780182B2

(12) United States Patent
Lakshmanan

(10) Patent No.: US 12,780,182 B2
(45) Date of Patent: Nov. 3, 2026

(54) AUTOMATED VALET PARKING

(71) Applicant: Robert Bosch GmbH, Stuttgart (DE)

(72) Inventor: Harikrishnan Lakshmanan, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 18/821,140

(22) Filed: Aug. 30, 2024

(65) Prior Publication Data

US 2026/0061990 A1 Mar. 5, 2026

(51) Int. Cl.

| | |
|---|---|
| ***B60W 30/06*** | (2006.01) |
| ***B60W 30/18*** | (2012.01) |
| ***B60W 60/00*** | (2020.01) |
| ***G08G 1/14*** | (2006.01) |

(52) U.S. Cl.
CPC ...... *B60W 30/06* (2013.01); *B60W 30/18154* (2013.01); *B60W 30/18159* (2020.02); *B60W 60/001* (2020.02); *G08G 1/142* (2013.01); *B60W 2552/53* (2020.02)

(58) Field of Classification Search
CPC ................................ B60W 30/06; G08G 1/146
See application file for complete search history.

(56) References Cited

U.S. PATENT DOCUMENTS

| | | | | |
|---|---|---|---|---|
| 8,947,260 | B2 | 2/2015 | Fukushima | |
| 11,377,097 | B2 | 7/2022 | Oh | |
| 11,887,479 | B2 | 1/2024 | Ikoma et al. | |
| 2017/0323567 | A1* | 11/2017 | Nordbruch | G08G 1/146 |
| 2019/0287400 | A1 | 9/2019 | Cao et al. | |
| 2020/0209886 | A1 | 7/2020 | Lee et al. | |
| 2021/0180954 | A1* | 6/2021 | Hiyokawa | G06V 20/586 |

OTHER PUBLICATIONS

Blue Intelligence, "AVP Control Outdoor Driving Technology", <https://blueintel.ai>, 2018, 14 pages.

* cited by examiner

*Primary Examiner* — Anshul Sood
(74) *Attorney, Agent, or Firm* — Michael Best & Friedrich LLP

(57) ABSTRACT

Examples provide an autonomous valet parking (AVP) server for a parking lot. The AVP server includes an electronic processor configured to detect that an autonomous vehicle is travelling along a guideline of a first aisle in the parking lot, and detect that the autonomous vehicle is stopped at a first intersection of the parking lot. In response to detecting that the autonomous vehicle is stopped at the first intersection, the electronic processor selects a direction for guiding the autonomous vehicle to an available parking space, and controls a first light projector located at the first intersection to project a first guideline connector that connects the guideline of the first aisle to a guideline of a second aisle in the selected direction. Detection of the first guideline connector by the autonomous vehicle causes the autonomous vehicle to travel along the first guideline connector to the second aisle.

19 Claims, 8 Drawing Sheets

AUTOMATED VALET PARKING

BACKGROUND

Embodiments, examples, and aspects described herein relate to, among other things, systems for autonomous vehicles and/or semi-autonomous vehicles.

SUMMARY

Autonomous and semi-autonomous vehicles rely on a variety of sensors to navigate through an environment. However, sensor capability (e.g., GPS sensor capability) may be limited when navigating through confined parking lots, parking garages, or other restricted spaces in which the autonomous or semi-autonomous vehicle does not have a stored map and in which other traffic may be present. Additionally, automated valet parking functionality is increasingly desired by autonomous vehicle customers.

Thus, there is a need for an automated valet parking (AVP) system for autonomous vehicles. One example provides a system for performing automated valet parking (AVP) in a parking lot. The system includes an AVP server associated with the parking lot; and a vehicle electronic processor associated with an autonomous vehicle; wherein the vehicle electronic processor is configured to activate an AVP mode of the autonomous vehicle, in response to activation of the AVP mode, detect a guideline along a first aisle of the parking lot and control the autonomous vehicle to travel along the guideline of the first aisle, determine that the autonomous vehicle has reached a first intersection in the parking lot, wherein the first intersection does not include guidelines, and control the autonomous vehicle to stop at the first intersection; wherein the AVP server is configured to in response to detecting that the autonomous vehicle is stopped at the first intersection based on image data received from an image sensor located at the first intersection, select a direction for guiding the autonomous vehicle to an available parking space, and control a first light projector located at the first intersection to project a first guideline connector that connects the guideline of the first aisle to a guideline of a second aisle in the selected direction, wherein detection of the first guideline connector by the autonomous vehicle causes the autonomous vehicle to travel along the first guideline connector to the second aisle.

In some aspects, the vehicle electronic processor is further configured to control the autonomous vehicle to travel along the guideline of the second aisle, detect an available parking space while travelling along the second aisle, and in response to detecting the available parking space, control the autonomous vehicle to park in the available parking space.

In some aspects, the AVP server is further configured to prior to arrival of the autonomous vehicle at the first intersection, control the first light projector to project a first stop line across the first aisle at the first intersection, wherein detection of the first stop line causes the autonomous vehicle to stop at the first intersection.

In some aspects, projecting the first guideline connector that connects the guideline of the first aisle to the guideline of the second aisle includes deactivating a projection of the first stop line.

In some aspects, the AVP server is further configured to in response to detecting, based on the image data, that the autonomous vehicle has passed through the first intersection, control the first light projector to reenable projection of the first stop line.

In some aspects, the AVP server is further configured to control the first light projector to project a respective stop line across each respective aisle of the first intersection.

In some aspects, a projector communicatively connected to the AVP server is located at each of a plurality of intersections in the parking lot.

In some aspects, respective guidelines are painted along each drivable aisle of the parking lot, and each of the plurality of intersections does not include painted guidelines.

In some aspects, the AVP server is configured to select the direction for guiding the autonomous vehicle to the available parking space such that the autonomous vehicle avoids traffic in the parking lot.

In some aspects, the AVP server is configured to select the direction for guiding the autonomous vehicle to the available parking space according to a load balancing scheme for occupied parking spaces in the parking lot.

In some aspects, the AVP server is further configured to detect a plurality of autonomous vehicles at the first intersection based on the image data, determine an order for guiding each of the plurality of autonomous vehicles through the first intersection, and control the first light projector to project respective stop lines and respective guideline connectors according to the order.

In some aspects, the AVP server is configured to determine the order based on at least one selected from the group consisting of a load balancing scheme for the parking lot, a number of autonomous vehicles at the first intersection, an aisle location of each autonomous vehicle at the first intersection, and a determined order of arrival of each autonomous vehicle at the first intersection.

In some aspects, the AVP server is further configured to control the first light projector to project a second guideline connector that connects the guideline of the first aisle to a guideline of a third aisle in a direction of an exit of the parking lot, wherein the first guideline connector is projected simultaneously with the second guideline connector, and the first guideline connector is projected in a different color and/or a different pattern than the second guideline connector.

In some aspects, the vehicle electronic processor is further configured to control the autonomous vehicle to travel along the first guideline connector or the second guideline connector based on a determination of whether the autonomous vehicle is in a parking mode or an exiting mode.

In some aspects, the AVP server is configured to determine parking space availability based on sensor data received from a plurality of object detection sensors located in the parking lot.

In some aspects, the AVP server is configured to determine parking space availability based on a determined number of autonomous vehicles that have entered the parking lot compared to a determined number of autonomous vehicles that have exited the parking lot.

Another example provides an automated valet parking (AVP) system in an autonomous vehicle. The system includes: a sensor configured to sense an environment surrounding the autonomous vehicle and output sensor data; and an electronic processor configured to receive user input activating an AVP mode of the autonomous vehicle, in response to activation of the AVP mode, detect, based on the sensor data, a guideline along a first aisle of a parking lot, control the autonomous vehicle to travel along the guideline of the first aisle, determine that the autonomous vehicle has reached a first intersection by detecting, based on the sensor data, a first stop line projected across the first aisle, wherein the first intersection does not include a guideline, in response to detecting the first stop line, control the autonomous vehicle to stop in the first aisle at the first intersection, detect a deactivation of the first stop line and a projection of a first guideline connector through the first intersection, the first guideline connector connecting the guideline of the first aisle to a guideline of a second aisle in a predetermined direction, control the autonomous vehicle to travel along the first guideline connector and along the guideline of the second aisle, detect, while travelling along the guideline of the second aisle, an available parking space, and in response to detecting the available parking space, control the autonomous vehicle to park in the available parking space.

In some aspects, the electronic processor is configured to at the first intersection, detect a projection of a second guideline connector through the first intersection, the second guideline connector connecting the guideline of the first aisle to a guideline of a third aisle in a direction of an exit of the parking lot, the first guideline connector being projected in a different color than the second guideline connector, and control the autonomous vehicle to travel along the first guideline connector or the second guideline connector based on a determination of whether the AVP system is executing an exit command or a parking command.

In some aspects, the electronic processor is further configured to receive an exit command from a remote server that provides an AVP mobile application to a mobile device associated with the autonomous vehicle, in response to receiving the exit command, control the autonomous vehicle to exit a parking space and travel along the guideline of the second aisle, in response to detecting, based on the sensor data, that the autonomous vehicle has reached a predefined exit area, identify an exit area parking space in the predefined exit area, and control the autonomous vehicle to park in the exit area parking space.

Another example provides an autonomous valet parking (AVP) server for a parking lot. The AVP server includes: an electronic processor configured to detect, based on sensor data received from a plurality of object detection sensors in the parking lot, that an autonomous vehicle is travelling along a guideline of a first aisle in the parking lot, detect that the autonomous vehicle is stopped at a first intersection of the parking lot based on image data received from an image sensor located at the first intersection, in response to detecting that the autonomous vehicle is stopped at the first intersection, select a direction for guiding the autonomous vehicle to an available parking space, and control a first light projector located at the first intersection to project a first guideline connector that connects the guideline of the first aisle to a guideline of a second aisle in the selected direction, wherein detection of the first guideline connector by the autonomous vehicle causes the autonomous vehicle to travel along the first guideline connector to the second aisle.

DETAILED DESCRIPTION

Figure 1:
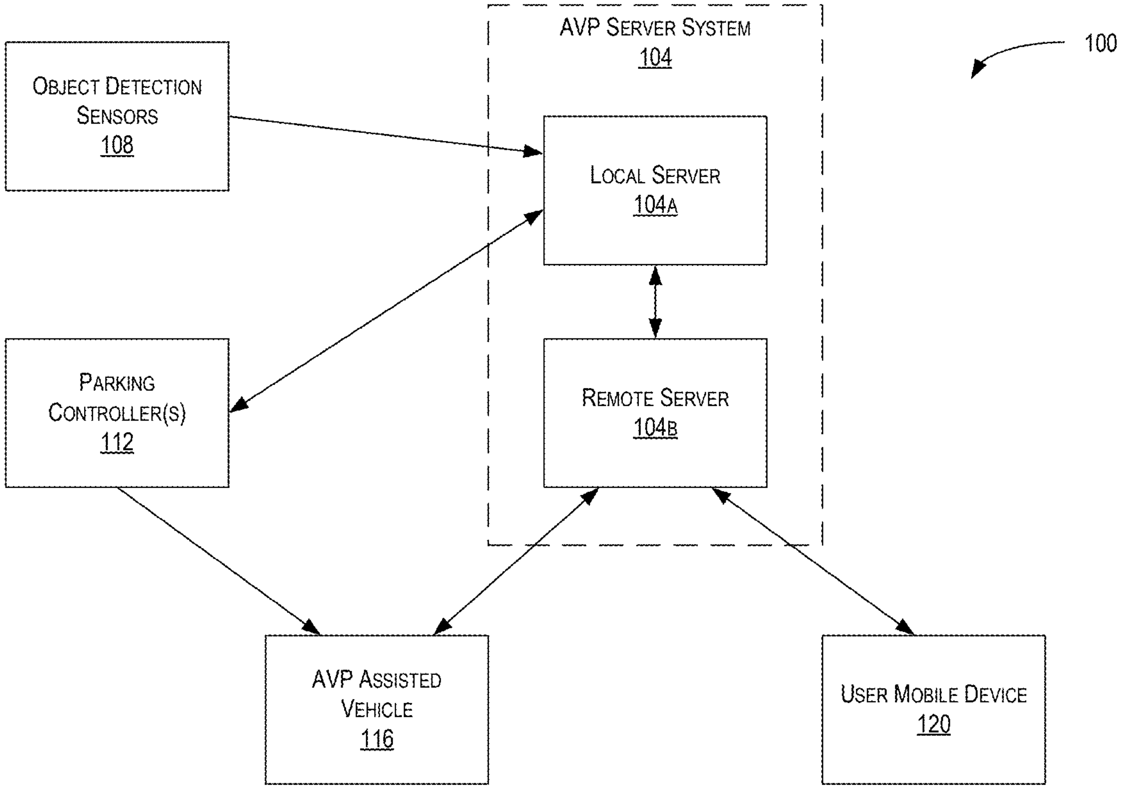
FIG. 1 schematically illustrates an automated valet parking (AVP) system, according to some examples.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms “mounted,” “connected” and “coupled” are used broadly and encompass both direct and indirect mounting, connecting, and coupling. Further, “connected” and “coupled” are not restricted to physical or mechanical connections or couplings, and can include electrical connections or couplings, whether direct or indirect. Also, electronic communications and notifications may be performed using any known means including wired connections, wireless connections, etc.

Unless the context of their usage unambiguously indicates otherwise, the articles “a,” “an,” and “the” should not be interpreted as meaning “one” or “only one.” Rather these articles should be interpreted as meaning “at least one” or “one or more.” Likewise, when the terms “the” or “said” are used to refer to a noun previously introduced by the indefinite article “a” or “an,” “the” and “said” mean “at least one” or “one or more” unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Referring now to the drawings, FIG. 1 schematically illustrates an example of an automated valet parking (AVP) system 100 that may be implemented in a parking lot. As used herein, the term "parking lot" may refer to an open-air parking lot and/or an indoor parking lot (e.g., a parking garage, underground parking, or another type of parking structure). In some instances, the parking lot is a limited human access parking lot. While described by way of example as being implemented in a parking lot, the AVP system 100 may alternatively be implemented in another defined space, such as a restaurant, a hospital, an airport, a school, and/or the like.

The system 100 includes an AVP server system 104 communicatively connected to a plurality of object detection sensors 108 located throughout a parking lot, one or more parking controllers 112 located through the parking lot, an AVP-assisted autonomous vehicle 116 (e.g., one or more AVP-assisted autonomous vehicles 116) operating in the parking lot, and a user mobile device 120 (e.g., one or more user mobile devices 120) associated with the AVP-assisted autonomous vehicle 116. The AVP server system 104 may include one or more servers local to and/or remote from the parking lot in which the AVP system 100 is implemented. For example, the AVP server system 104 may include a local server 104*a* (e.g., one or more local servers 104*a*) that is communicatively connected to the object detection sensors and the parking controllers 112 and a remote or cloud server 104*b* (e.g., one or more remote servers 104*b*) that is communicatively connected to the local server 104*a*, the AVP-assisted vehicle 116, and the mobile user device 120. The AVP servers 104 are described in greater detail below with respect to FIG. 2.

The object detection sensors 108 are implemented using, for example, a variety of object detection technologies. The object detection sensors 108 are implemented using suitable object detection technologies such as, for example, image sensors, LiDAR sensors, radar sensors, ultrasonic sensors, or a combination thereof. The object detection sensors 108 are arranged throughout the parking lot (e.g., at entrances exits, aisles, intersections, etc.) for sensing objects (e.g., vehicles, humans, debris, etc.) in the parking lot and outputting sensor data to the AVP server system 104.

Figure 2:
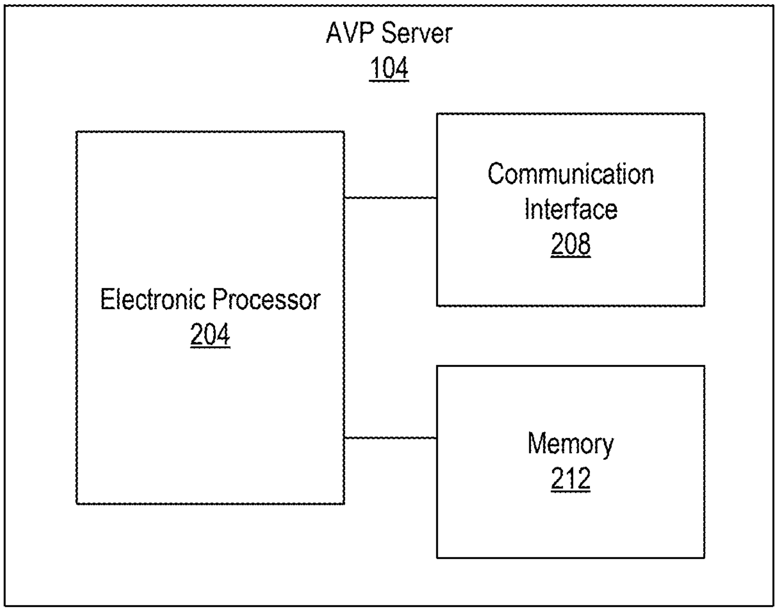
FIG. 2 schematically illustrates an AVP server, according to some examples.

FIG. 2 illustrates a simplified block diagram of an example AVP server 104 (e.g., any one of the local server 104*a* and/or the remote server 104*b*). Each AVP server 104 includes, among other things, an electronic processor 204 (e.g., one or more electronic processors 204) communicatively connected to a communication interface 208 (e.g., one or more communication interfaces 208) and a memory 212 (e.g., one or more memories 212). The communication interface 208 enables communication between the AVP server 104 and other components of the AVP system 100, such as the object detection sensors 108, the parking controllers 112, the AVP-assisted autonomous vehicle 116, the user mobile device 120, and/or other AVP servers 104. The memory 212 stores, among other things, program instructions for executing methods describes herein.

Figure 3:
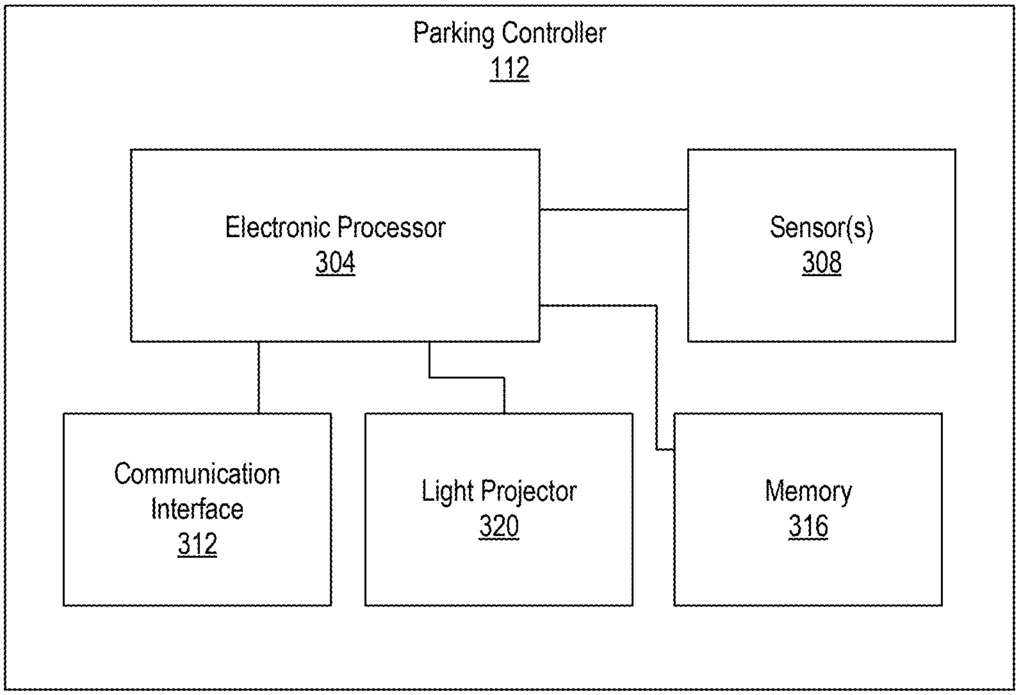
FIG. 3 schematically illustrates a parking controller, according to some examples.

FIG. 3 illustrates a simplified block diagram of a parking controller 112. The parking controller 112 includes an electronic processor 304 communicatively connected to one or more sensors 308 (e.g., one or more image sensors 108), a communication interface 312, a memory 316, and a light projector 320 (e.g., one or more light projectors 320). As described in greater detail below with respect to FIG. 5, each parking controller 112 is positioned in predetermined decision locations of the parking lot (e.g., intersections between two or more aisles) and is configured to project, using the light projector 320 based on commands received from the AVP server system 104 (e.g., from the local AVP server 104*a*), guidelines on the floor of the parking lot for guiding autonomous vehicles through the decision location. The parking controllers 112 may be located (e.g., mounted) on walls of the parking lot, on ceiling of the parking lot, on floors of the parking lot, or the like.

Figure 4:
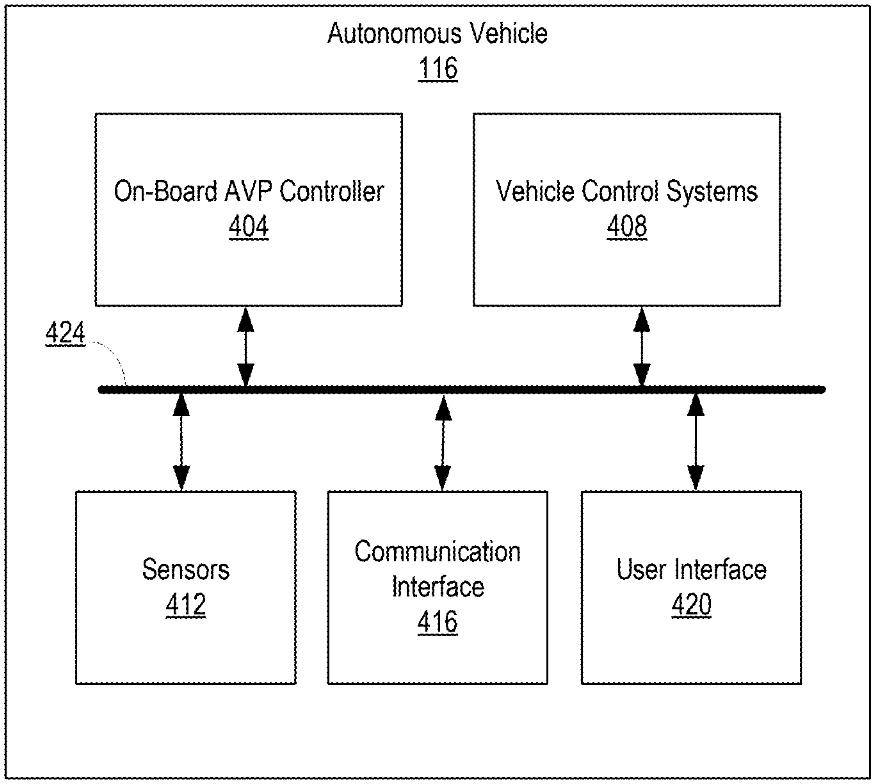
FIG. 4 schematically illustrates an autonomous vehicle, according to some examples.

FIG. 4 illustrates a simplified block diagram of the AVP-assisted autonomous vehicle 116, otherwise referred to as the autonomous vehicle 116. The term "autonomous vehicle" is used in an inclusive way to refer to an autonomous or partially autonomous vehicle, which possesses varying degrees of automation (that is, the vehicle is configured to drive itself with limited, or in some cases no, input from a driver). The term "driver," as used herein, generally refers to an occupant of a vehicle and/or a remote user of the vehicle who operates the controls of the vehicle or provides control input to the vehicle to influence the operation of the vehicle. Additionally, while described herein by way of example as being a passenger vehicle, in some instances, the autonomous vehicle 116 is a vehicle for transporting deliveries or other cargo (e.g., packages, meals, or the like).

In the illustrated example, the autonomous vehicle 116 includes an on-board AVP controller 404 (e.g., an electronic processor), vehicle control systems 408, a plurality of sensors 412 installed on the autonomous vehicle 116, a communication interface 416, and a user interface 420. The components of the autonomous vehicle 116, along with other various modules and components are electrically and communicatively coupled to each other via direct connections or by or through one or more control or data buses (for example, the bus 424), which enable communication therebetween. The use of control and data buses for the interconnection between, and communication among, the various modules and components would be known to a person skilled in the art in view of the invention described herein. In some instances, the bus 424 is a controller area network (CAN) bus. In some instances, the bus 424 is an automotive Ethernet, a FlexRay™ communications bus, or another suitable bus. In some instances, some or all of the components of the autonomous vehicle 116 may be communicatively coupled using suitable wireless modalities (for example, Bluetooth™ or near field communication connections).

The vehicle sensors 412 are configured to, among other things, sense an environment surrounding the autonomous vehicle 116. For example, the vehicle sensors 412 include image sensors that are configured to detect guidelines 516, stop lines 704, guideline connectors 712, 716, and the like as described herein as well as distinguishing features between these lines (e.g., color, pattern, and/or the like). The AVP controller 404 determines control commands based on sensor data received from the plurality of sensors 412 based on user input received from the user input interface 420, and/or based on user commands received from the communication interface 416. For example, the remote AVP server 104*b* may receive a command or other information from the user mobile device 120 via an application programming interface (API) associated with an AVP application installed on the user mobile device 120. The remote AVP server 104*b* may in turn transmit, using the server communication interface 208, the command or other information to the vehicle communication interface 416 over a suitable communication network.

The AVP controller 404 transmits determined control commands to, among other things, the vehicle control systems 408 to operate or assist in operating the autonomous vehicle 116 (for example, by generating braking signals, acceleration signals, steering signals). In some instances, the AVP controller 404 is part of one or more vehicle controllers that implement autonomous or partially autonomous control of the autonomous vehicle 116. The AVP controller 404 may be located in a suitable location or locations in the autonomous vehicle 116. The AVP controller 404 may otherwise be referred to herein as the vehicle electronic processor 404.

Figure 5:
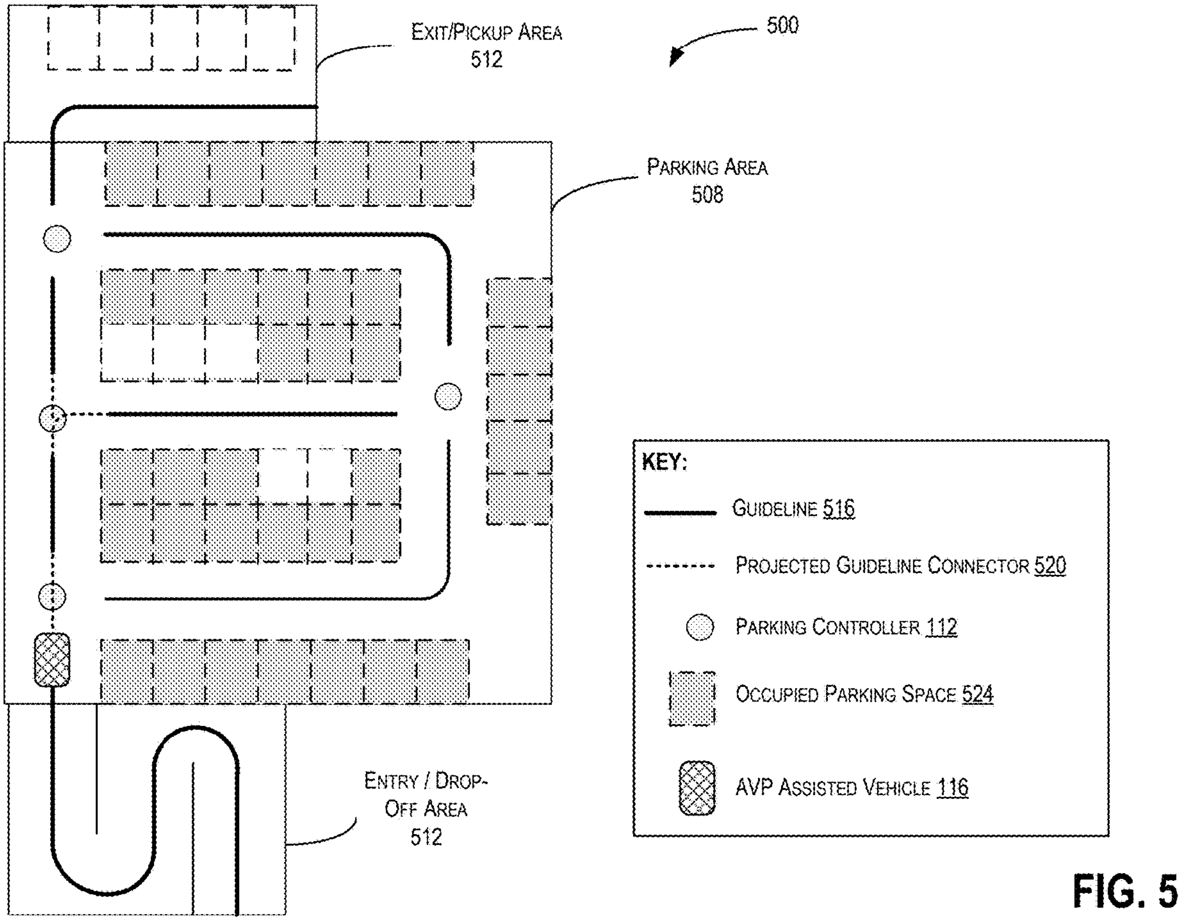
FIG. 5 illustrates an AVP-enabled parking lot, according to some examples.

FIG. 5 illustrates an example layout of an AVP-enabled parking lot 500 in which the AVP system 100 may be implemented. In the illustrated example, the parking lot 500 includes an entry area 504, or entry queue 504, an AVP parking area 508, and an exit or pickup area 512. However, in some instances, the parking lot 500 includes multiple entry areas 504, multiple AVP parking areas 508, and/or multiple exit areas 512. The entry area 504 is an area in which a passenger or other user of the vehicle 116 may drop off the autonomous vehicle 116 and activate an AVP mode of the autonomous vehicle 116. The exit area 512 is an area in which the passenger or other user of the autonomous vehicle 116 may retrieve the autonomous vehicle 116. In some instances, the entry area 504 and the exit area 512 are a shared space.

Guidelines 516 are located along aisles of the parking lot 500, and the AVP controller 404 is configured to detect, using sensor data (e.g., image data or the like) received from the vehicle sensors 412, the presence of the guidelines 516 as the autonomous vehicle 116 travels along the aisles of the parking lot 500. The guidelines 516 are painted transferred, or otherwise applied to the floors of the parking lot aisles and may be referred to as permanent or semi-permanent guidelines. In some instances, the guidelines are formed in a predetermined color (e.g., a color different than white or yellow). While each aisle of the parking lot 500 is illustrated in FIG. 5 as including only one guideline 516, in some instances, each aisle of the parking lot 500 includes two guidelines respectively corresponding to traffic directions in the aisles. In some instances, each of the two guidelines 516 in a respective aisle have a different color based on the direction of travel associated with the respective guideline 516. In some instances, each aisle of the parking lot 500 is a one-way aisle.

As illustrated in the example of FIG. 5, the intersections of the parking lot 500 do not include guidelines 516. Parking controllers 112 are positioned at these intersections, otherwise referred to as decision locations, and are configured to selectively project guideline connectors 520 (i.e., temporary guidelines) through the respective intersections for guiding the autonomous vehicle 116 through the intersection. The guideline connectors 520 may temporarily connect one guideline 516 of one aisle (or portion of an aisle) to another guideline 516 of another aisle (or a portion of an aisle) as explained in greater detail herein.

Figure 6:
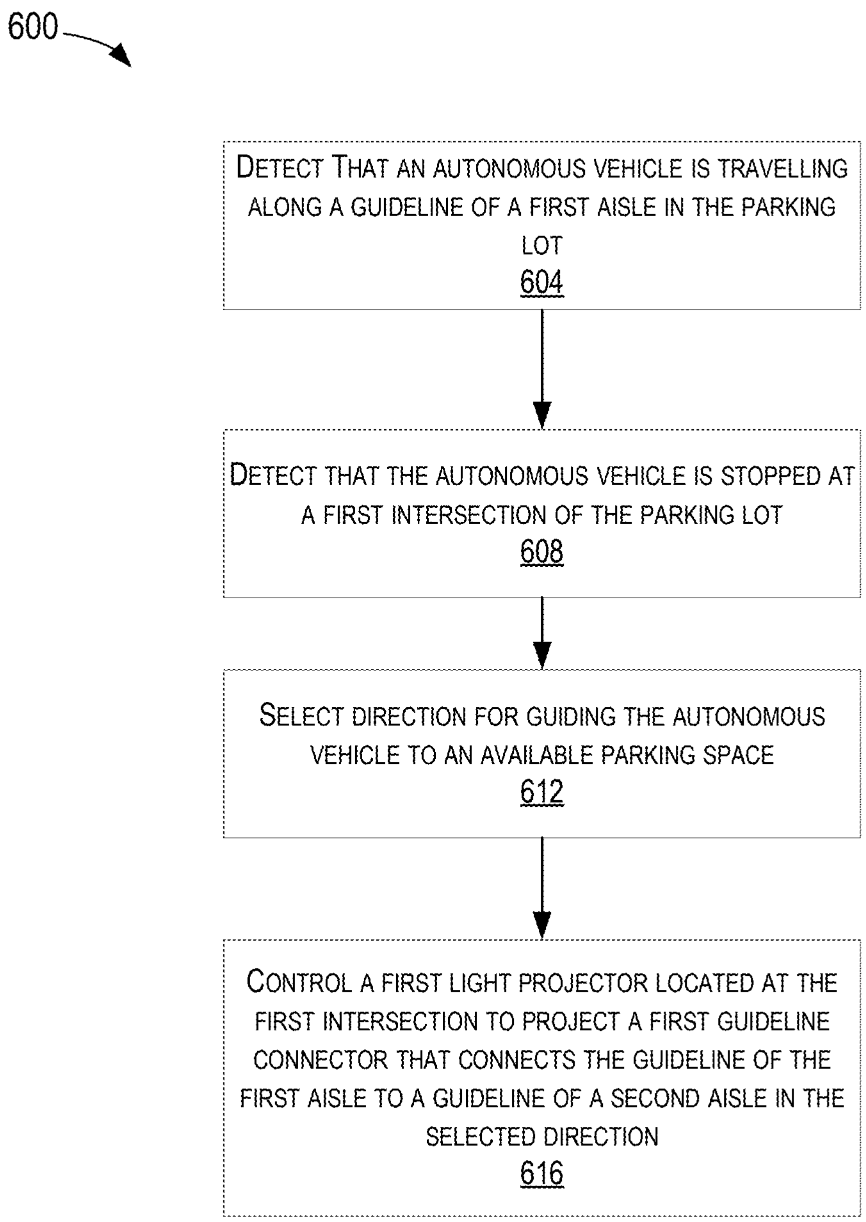
FIG. 6 illustrates a method for guiding an autonomous vehicle through an AVP-enabled parking lot, according to some examples.

For example, FIG. 6 illustrates a method 600 executed by the AVP server system 104 (e.g., using a local server **104*a*) for guiding the autonomous vehicle 116 through the parking lot 500. For simplicity, the method 600 will be described with respect to the local AVP server 104*a*. The local AVP server 104*a* detects, based on sensor data received from the plurality of object detection sensors 108, that the autonomous vehicle 116 is travelling along a guideline 516 of a first aisle of the parking lot 500 (at block 604). For example, the local AVP server 104*a* may receive sensor data indicating that the autonomous vehicle 116 has entered the entry area 504, entered the parking area 508, or is otherwise travelling through a particular aisle of the parking lot 500**.

In some instances, the local AVP server **104*a* tracks an availability of parking spaces in the parking lot 500 by incrementing a counter in response to detecting that a vehicle has entered the parking area 508 and decrementing the counter in response to detecting that a vehicle has exited the parking area 508. In some instances, the local AVP server 104*a* tracks an availability of parking spaces in the parking lot 500** based on load cell sensor data or camera data.

The local AVP server **104*a* detects, based on sensor data received from the plurality of object detection sensors 108 and/or sensor data receive from the parking controller sensor 308, that the autonomous vehicle 116 is stopped at an intersection (e.g., a first intersection) of the parking lot 500 (at block 608). For example, the local AVP server 104*a* may receive image data from the parking controller 112 or otherwise receive an indication from the parking controller 112 indicating that the autonomous vehicle 116** is detected in the first aisle at the first intersection.

In response to detecting that the autonomous vehicle 116 is stopped at the first intersection, the local AVP server **104*a* selects a direction for guiding the autonomous vehicle to an available parking space (at block 612). For example, based on sensor data received from the plurality of object detection sensors 108, the local AVP server 104*a* determines locations of occupied parking spaces 524 in the parking lot 500. In some instances, the local AVP server 104*a* selects the direction for guiding the autonomous vehicle 116 to an available parking space such that the autonomous vehicle 116 avoids traffic congestion in the aisles of the parking lot 500 (e.g., based on detected locations of other vehicles in the parking lot 500). For example, in response to determining that two previous vehicles have been guided from the first intersection into the same aisle toward an available parking space, the local AVP server 104*a* may select the direction such that the autonomous vehicle 116 (e.g., the third autonomous vehicle) is guided toward a different aisle that has less traffic. As another example where the local AVP server 104*a* determines that a vehicle is travelling in a aisle toward an exit of the parking lot, the local AVP server 104*a* may select the direction for guiding the autonomous vehicle 116 to an available parking space such that the autonomous vehicle 116** avoids the aisle in which the exiting vehicle is travelling.

In some instances, the local AVP server **104*a* selects the direction for guiding the autonomous vehicle 116 to an available parking space according to a load balancing scheme for occupied parking spaces 524 in the parking lot 500. For example, in response to determining that there are fewer available parking spaces in an aisle in a forward direction relative to the location of the autonomous vehicle 116 compared to an aisle in a rightward direction, the local AVP server 104*a* selects the rightward direction for guiding the autonomous vehicle 116** to an available parking space.

As described above, each intersection in the parking lot 500 represents a decision location at which a respective parking controller 112 is located. The local AVP server **104*a* controls the light projector 320 of the respective parking controller 112 located at the first intersection to project a guideline connector 520 that connects the guideline 516 of the first aisle to a guideline 516 of a second aisle in the selected direction (at block 616). Detection of the guideline connector 520 by the autonomous vehicle 116 causes the autonomous vehicle 116 to travel along the guideline connector 520 to the guideline 516 of the second aisle. The local AVP server 104***a* controls the light projector 320 by, for example, transmitting a command to the communication interface 312 of the respective parking controller 112. As described above, the intersections of the intersections of the parking lot 500 do not otherwise include guidelines 516. Therefore, the local AVP server 104*a* is able to dynamically direct traffic through the intersections without the need for sending direct commands to the autonomous vehicle 116.

Figure 7A:
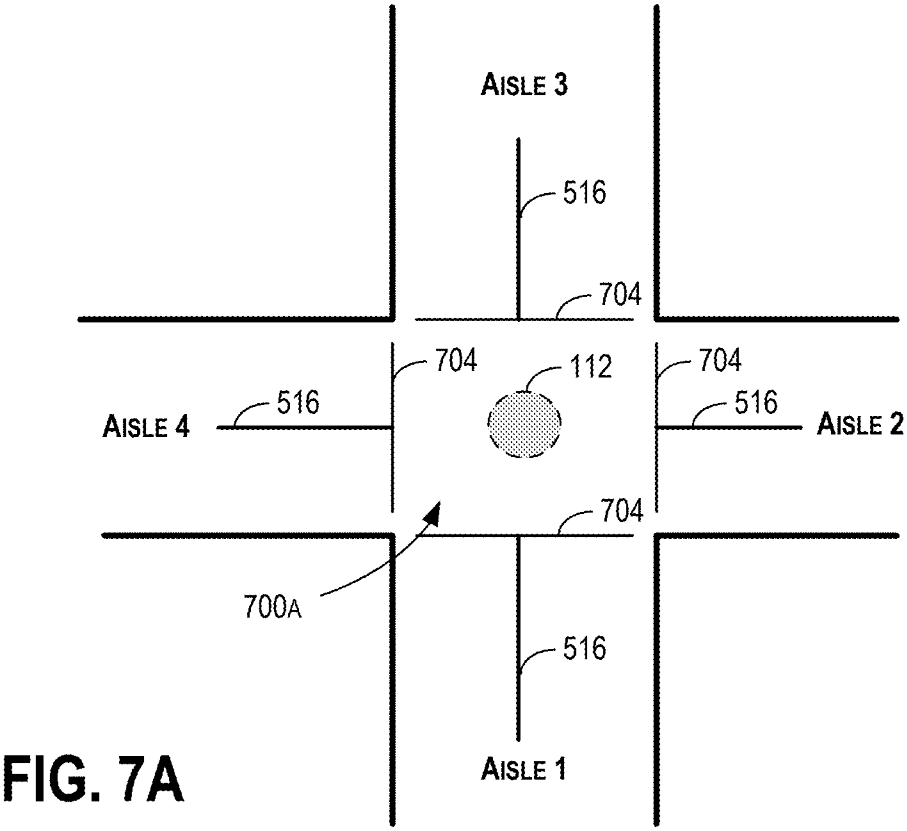
FIG. 7A illustrates light projections at an intersection of an AVP-enabled parking lot, according to some examples.

In some instances, prior to detected arrival of the autonomous vehicle 116 at the first intersection (e.g., at block 604), the local AVP server 104*a* controls the first light projector 320 to project a stop line across the first aisle at the first intersection. For example, FIG. 7A illustrates an example intersection 700*a* having a respective stop line 704 projected thereon by the parking controller 112 for each aisle that leads into the intersection 700*a*. In some instances, the local AVP server 104*a* controls the light projector 320 such that the stop lines 704 are projected regardless of detection of a vehicle in a respective aisle. However, in some instances, the local AVP server 104*a* controls the light projector 320 to only project respective stop lines across aisles in which an approaching vehicle is detected. The local AVP server 104*a* may control the light projector 320 to stop projecting one or more stop lines 704 during projection of the guideline connector(s) 520 in order to allow the autonomous vehicle 116 to pass through the intersection 700*a*. The local AVP server 104*a* may reenable projection of the one or more stop lines in response to determining that the autonomous vehicle 116 has passed through the first intersection.

Figure 7B:
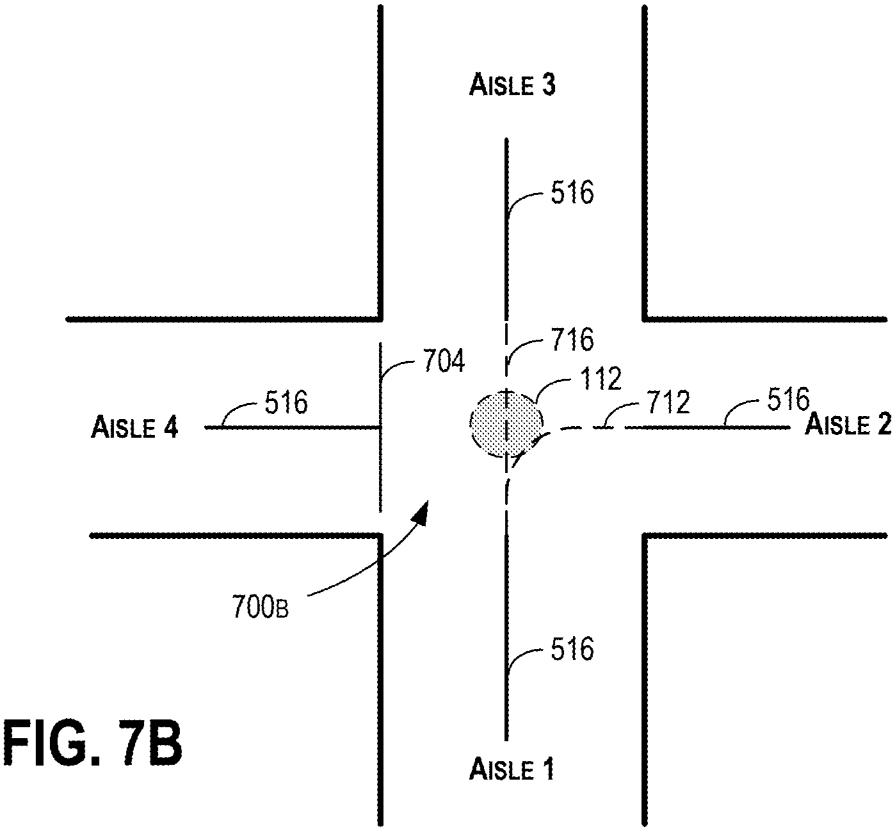
FIG. 7B illustrates light projections at an intersection of an AVP-enabled parking lot, according to some examples.

FIG. 7B illustrates an example intersection 700*b* having a guideline connector projected thereon by the parking controller 112. In some instances, such as the example illustrated in FIG. 7B, the local AVP server 104*a* controls the light projector 320 to project a first guideline connector 712 for directing the autonomous vehicle 116 to an available parking space and projects a second guideline connector 716 for directing the autonomous vehicle 116 to the exit area 512. In the illustrated example, the first guideline connector 712 connects the guideline 516 of the first aisle to a guide of the second aisle in the selected direction (e.g., a rightward selected direction), and the second guideline connector 716 connects the guideline of the first aisle to a guideline of a third aisle in a direction of the exit area 512 of the parking lot 500 (e.g., a straight direction).

In some instances, the first guideline connector 712 is projected simultaneously with the second guideline connector 716. In such instances, the local AVP server 104*a* controls the light projector 320 to project the first guideline connector 712 in a different color and/or a different pattern than the second guideline connector 716. For example, guideline connectors associated with a parking direction are projected in a first predetermined color, and guideline connectors associated with an exiting direction are projected in a second predetermined color different from the first predetermined color. In this manner, the sensors 412 of the autonomous vehicle 116 may distinguish between the two guideline connectors 712 and 716, and the AVP controller 404 of the autonomous vehicle 116 controls the autonomous vehicle 116 to travel along the first guideline connector or the second guideline connector based on a determination of whether the autonomous vehicle 116 is in a parking mode or an exiting mode.

In some instances, such as when the direction toward an available parking space is the same as the direction toward the exit area 512, the local AVP server 104*a* controls the light projector 320 to project only a single guideline connector through the intersection. In such instances, the local AVP server 104*a* may control the light projector 320 to project the single guideline connector in a third predetermined manner (e.g., color, pattern, and/or the like) that is associated with both a parking and exiting direction. In some instances, the third predetermined color is the same color as the guidelines 516.

In some instances, the local AVP server 104*a* detects a plurality of vehicles at the first intersection, and determines an order for guiding each of the plurality of vehicles through the first intersection. The local AVP server 104*a* may determine the order according to a load balancing scheme for the parking lot 500, based on the number of vehicles at the intersection and the aisle locations of each vehicle, the determined order of arrival of each vehicle to the first intersection, or the like. For example, the local AVP server 104*a* may determine that a large number of parking spaces are available in the third aisle, and as a result direct all vehicles exiting from the third aisle through the intersection before other vehicles at the intersection in order to make room for vehicles to enter the third aisle and park. As another example, in instances where the local AVP server 104*a* has information regarding the AVP mode of each vehicle (e.g., parking or exiting), the local AVP server 104*a* may direct exiting vehicles through the intersection before parking vehicles.

Figure 8:
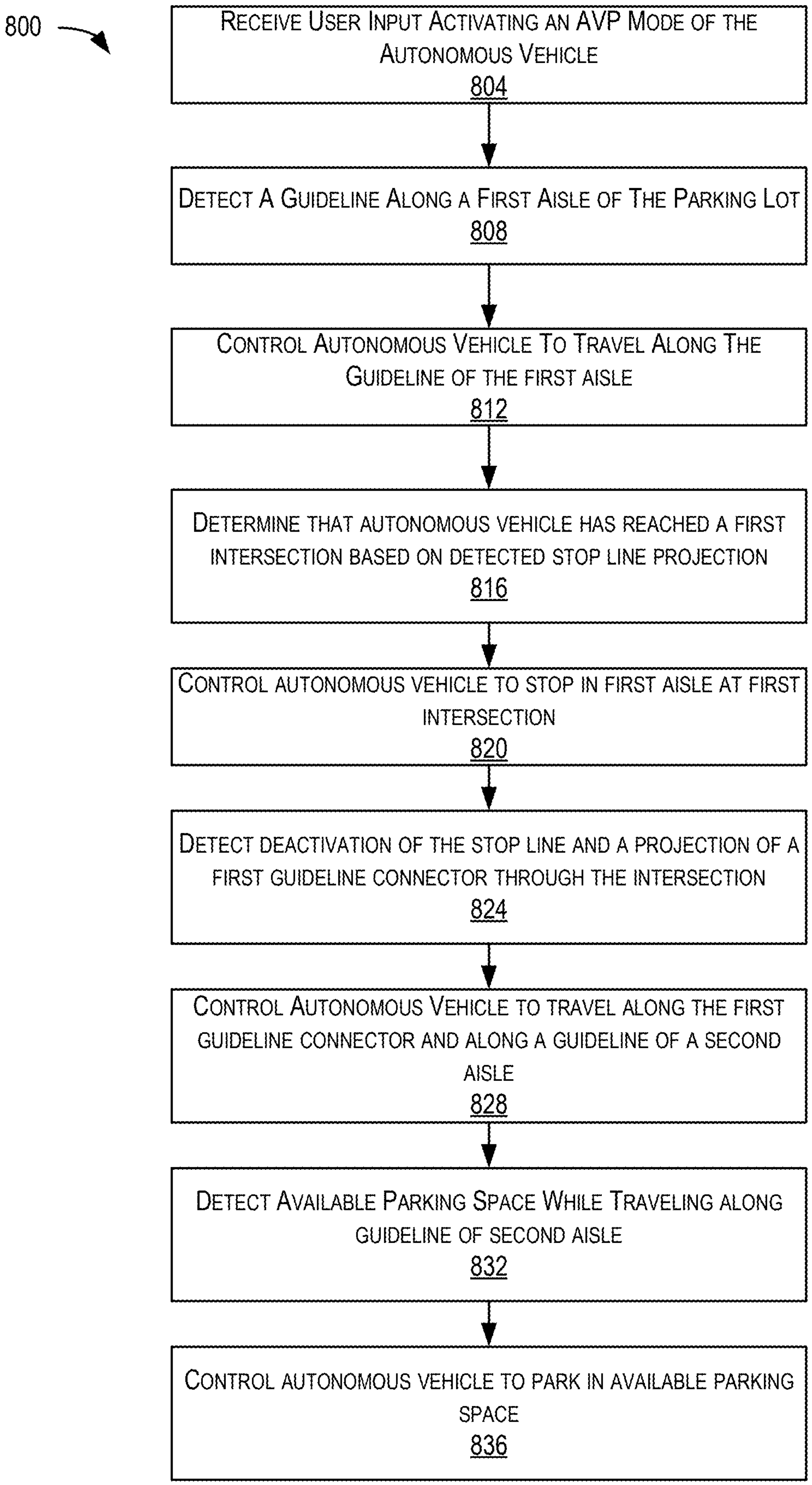
FIG. 8 illustrates a method for parking in an AVP-enabled parking lot performed by an autonomous vehicle, according to some examples.

FIG. 8 illustrates a method 800 executed by the vehicle electronic processor 404 for navigating the autonomous vehicle 116 through the parking lot 500. Some or all of the method 800 is executed simultaneously with the method 600. The vehicle electronic processor 404 receives user input activating an AVP mode of the autonomous vehicle 116 (at block 804). The vehicle electronic processor 404 receives the user input through, for example, the vehicle user interface 420 (e.g., as a button press, a switch actuation, a voice command, a touch screen input, etc.) or the vehicle communication interface 416. For example, the user input may be transmitted to the vehicle communication interface 416 from the user mobile device 120 via the remote server 104*b* (e.g., by means of one or more AVP APIs between the vehicle communication interface 420, the server communication interface 208, and the user mobile device 120). The user input may be received by the vehicle electronic processor 404 in response to the vehicle being dropped off at the entry area 504 of the parking lot 500.

In response to receiving the user input activating the AVP mode, the vehicle electronic processor 404 detects, based on sensor data received from the vehicle sensors 412, a guideline 516 along a first aisle of the parking lot 500 (at block 808). The detected guideline may be in the entry area 504 and/or the parking area 508. For example, the detected guideline 516 along the first aisle may begin in the entry area 504 and extend into the parking area 508. The vehicle electronic processor 404 controls the autonomous vehicle 116 (e.g., by transmitting commands to the vehicle control systems 408) to travel along the detected guideline 516 of the first aisle (at block 812).

While travelling along the guideline 516, the vehicle electronic processor 404 determines that the autonomous vehicle 116 has reached a first intersection of the parking lot 500 by detecting, based on the sensor data received from the vehicle sensors 412, a first stop line (e.g., any one of the stop lines 704 illustrated in the example intersection 700*a* of FIG. 7A) projected by a parking controller 112 using the light projector 320 across the first aisle in which the autonomous vehicle 116 travels (at block 816). In response to detecting the first stop line, the vehicle electronic processor 404 controls the autonomous vehicle 116 to stop in the first aisle at the first intersection (at block 820).

The vehicle electronic processor 404 detects a deactivation of the first stop line and a projection of a first guideline connector (e.g., the first guideline connector 712 illustrated in FIG. 7B) that connects the guideline 516 of the first aisle to a guideline 516 of a second aisle in a predetermined direction (at block 824). The predetermined direction is, for example, the direction selected by the local AVP server 104*a* (at block 612 of the method 600) for guiding the autonomous vehicle 116 toward an available parking space. In response to detection of the first guideline connector (and no longer detecting the stop line 704), the vehicle electronic processor 404 controls the autonomous vehicle 116 to travel along the first guideline connector and along the guideline 516 of the second aisle in the predetermined direction (at block 828).

In some instances, detecting the first guideline connector (at block 824) also includes detecting a second guideline connector (e.g., the second guideline connector 716 illustrated in FIG. 7B) that connects the guideline 516 of the first aisle to a guideline 516 of a third aisle in a direction of the exit area 512. The vehicle electronic processor 404 may distinguish between the first guideline connector and the second guideline connector based on respective detected colors of the first guideline connector and the second guideline connector, respective detected patterns of the first guideline connector and the second guideline connector, and/or the like. In such instances, the vehicle electronic processor 404 controls the autonomous vehicle 116 to travel along either the first guideline connector or the second guideline connector based on a determination of whether the autonomous vehicle 116 is performing a parking operation or an exiting operation. For example, when performing an operation to park in the parking lot 500, the vehicle electronic processor 404 controls the autonomous vehicle 116 to travel along the first guideline connector to the second aisle (e.g., first guideline connector 712 in FIG. 7B). In contrast, when performing an operation to exit the parking lot 500, the vehicle electronic processor 404 controls the autonomous vehicle to travel along the second guideline connector to the third aisle (e.g., second guideline connector 716 in FIG. 7B).

As described above, in some instances, the direction toward the exit area 512 is the same as the direction toward an available parking space, and the parking controller 112 projects only one guideline connector through the intersection. In such instances, the vehicle electronic processor 404 controls the autonomous vehicle 116 to travel along the one guideline connector.

In some instances, while travelling along the guideline 516 of the second aisle, the vehicle electronic processor 404 detects, based on sensor data received from the vehicle sensors 412, an available parking space in the second aisle (at block 832). In response to detecting the available parking space, the vehicle electronic processor 404 controls the autonomous vehicle to park in the detected available parking space (e.g., according to a defined parking function of the autonomous vehicle) (at block 836).

While the detected available parking space is described by way of example as being in the second aisle, the autonomous vehicle 116 may encounter additional intersections prior to detecting an available parking space. In such instances, the vehicle electronic processor 404 may repeat similar operations as described in blocks 816-828 with respect to other aisles and/or other intersections of the parking lot 500.

Figure 9:
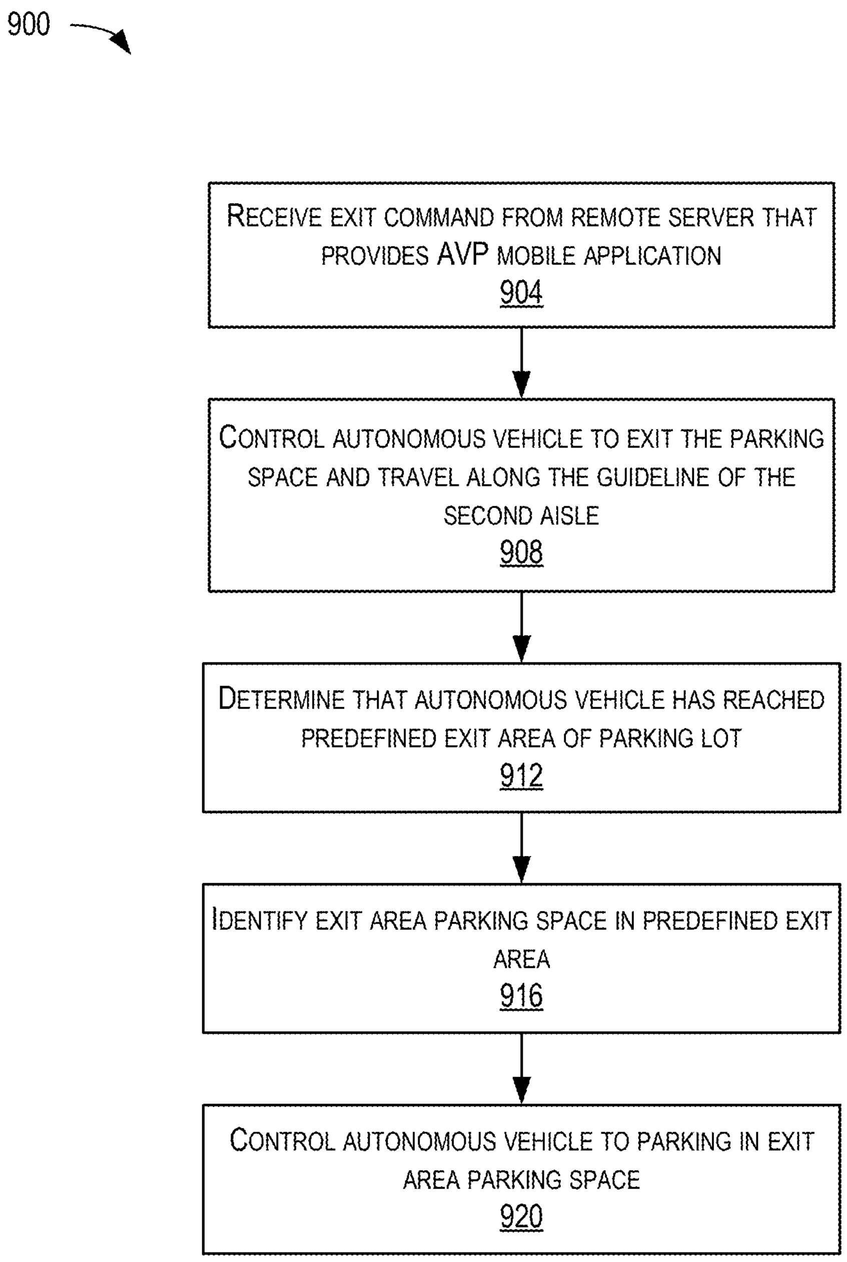
FIG. 9 illustrates a method for exiting an AVP-enabled parking lot performed by an autonomous vehicle, according to some examples.

FIG. 9 illustrates a method 900 executed by the vehicle electronic processor 404 for controlling the autonomous vehicle 116 to exit the parking lot 500. The method 900 is performed, for example, after the autonomous vehicle 116 as parked in an available parking space in the parking area 508. The vehicle electronic processor 404 receives an exit command from the remote server 104*b* (e.g., using one or more AVP APIs) (at block 904). The remote server 104*b* may transmit the exit command to the vehicle electronic processor 404 in response to receiving the exit command from the user mobile device 120 associated with the autonomous vehicle 116 via an AVP mobile application installed on the user mobile device 120. In some instances, the remote server 104*b* transmits the exit command according to a user-selected scheduled exit time for the autonomous vehicle 116.

In response to receiving the exit command, the vehicle electronic processor 404 controls the autonomous vehicle 116 to exit the parking space and travel along the guideline 516 of the aisle in which the parking space is located (e.g., the second aisle) (at block 908). The vehicle electronic processor 404 controls the autonomous vehicle to travel through the parking area 508 of the parking lot 500 until the vehicle electronic processor 404 detects that the autonomous vehicle has reached the exit area 512 (at block 912). For example, the vehicle electronic processor 404 may navigate the autonomous vehicle 116 through one or more intersections in a manner similar to that described above with respect to FIG. 8. As described above, the vehicle electronic processor 404 controls the autonomous vehicle to travel along the appropriate guideline connector of each intersection based on a determination of whether the autonomous vehicle is parking in the parking lot 500 or exiting from the parking lot 500.

In some instances, in response to detecting that the autonomous vehicle 116 has reached the exit area 512, the vehicle electronic processor 404 identifies an available parking space in the exit area 512 (at block 916), and controls the autonomous vehicle to park in the identified exit area parking space (at block 920). However, in some instances, the vehicle electronic processor 404 controls the autonomous vehicle to travel to a vehicle pickup queue or other designated space in the exit area 512.

As is evident from the disclosure, this disclosure provides an AVP parking system that does not require the vehicles to store a map of the parking lot 500 and that does not require vehicle-to-vehicle communication. Additionally, in some instances, the local AVP server 104*a* and the parking controllers 112 (i.e., the parking lot infrastructure) does not need to receive and store vehicular control signals that indicate what type of operation (e.g., parking or exiting) in which the vehicle 116 is engaged. Accordingly, the disclosure provides a technological improvement to AVP parking functionality by utilizing less processing power and less communication bandwidth while still allowing autonomous vehicles to reliably and efficiently move into, out of, and within a parking lot. Additionally, the disclosed AVP parking system is easier to install, implement, and maintain than other parking systems that require one or more of the above-noted additional features in order to properly function.

Thus, aspects herein provide, among other things, systems and methods for automated valet parking.

What is claimed is:

1. A system for performing automated valet parking (AVP) in a parking lot, the system comprising:
  an AVP server associated with the parking lot; and
  a vehicle electronic processor associated with an autonomous vehicle;
  wherein the vehicle electronic processor is configured to activate an AVP mode of the autonomous vehicle, in response to activation of the AVP mode, detect a guideline along a first aisle of the parking lot and control the autonomous vehicle to travel along the guideline of the first aisle, determine that the autonomous vehicle has reached a first intersection in the parking lot, wherein the first intersection does not include guidelines, and control the autonomous vehicle to stop at the first intersection;

wherein the AVP server is configured to;

prior to the arrival of the autonomous vehicle at the first intersection, control a first light projector to project a first stop line across the first aisle at the first intersection, wherein detection of the first stop line causes the autonomous vehicle to stop at the first intersection, in response to detecting that the autonomous vehicle is stopped at the first intersection based on image data received from an image sensor located at the first intersection, select a direction for guiding the autonomous vehicle to an available parking space, and control the first light projector located at the first intersection to project a first guideline connector that connects the guideline of the first aisle to a guideline of a second aisle in the selected direction, wherein detection of the first guideline connector by the autonomous vehicle causes the autonomous vehicle to travel along the first guideline connector to the second aisle.

2. The system of claim 1, wherein the vehicle electronic processor is further configured to control the autonomous vehicle to travel along the guideline of the second aisle, detect an available parking space while travelling along the second aisle, and in response to detecting the available parking space, control the autonomous vehicle to park in the available parking space.

3. The system of claim 1, wherein projecting the first guideline connector that connects the guideline of the first aisle to the guideline of the second aisle includes deactivating a projection of the first stop line.

4. The system of claim 3, wherein the AVP server is further configured to in response to detecting, based on the image data, that the autonomous vehicle has passed through the first intersection, control the first light projector to reenable projection of the first stop line.

5. The system of claim 1, wherein the AVP server is further configured to control the first light projector to project a respective stop line across each respective aisle of the first intersection.

6. The system of claim 1, wherein a projector communicatively connected to the AVP server is located at each of a plurality of intersections in the parking lot.

7. The system of claim 6, wherein respective guidelines are painted along each drivable aisle of the parking lot, and each of the plurality of intersections does not include painted guidelines.

8. The system of claim 1, wherein the AVP server is configured to select the direction for guiding the autonomous vehicle to the available parking space such that the autonomous vehicle avoids traffic in the parking lot.

9. The system of claim 1, wherein the AVP server is configured to select the direction for guiding the autonomous vehicle to the available parking space according to a load balancing scheme for occupied parking spaces in the parking lot.

10. The system of claim 1, wherein the AVP server is further configured to detect a plurality of autonomous vehicles at the first intersection based on the image data, determine an order for guiding each of the plurality of autonomous vehicles through the first intersection, and control the first light projector to project respective stop lines and respective guideline connectors according to the order.

11. The system of claim 10, wherein the AVP server is configured to determine the order based on at least one selected from the group consisting of a load balancing scheme for the parking lot, a number of autonomous vehicles at the first intersection, an aisle location of each autonomous vehicle at the first intersection, and a determined order of arrival of each autonomous vehicle at the first intersection.

12. The system of claim 1, wherein the AVP server is further configured to control the first light projector to project a second guideline connector that connects the guideline of the first aisle to a guideline of a third aisle in a direction of an exit of the parking lot, wherein the first guideline connector is projected simultaneously with the second guideline connector, and the first guideline connector is projected in a different color and/or a different pattern than the second guideline connector.

13. The system of claim 12, wherein the vehicle electronic processor is further configured to control the autonomous vehicle to travel along the first guideline connector or the second guideline connector based on a determination of whether the autonomous vehicle is in a parking mode or an exiting mode.

14. The system of claim 1, wherein the AVP server is configured to determine parking space availability based on sensor data received from a plurality of object detection sensors located in the parking lot.

15. The system of claim 1, wherein the AVP server is configured to determine parking space availability based on a determined number of autonomous vehicles that have entered the parking lot compared to a determined number of autonomous vehicles that have exited the parking lot.

16. An automated valet parking (AVP) system in an autonomous vehicle, the system comprising:

a sensor configured to sense an environment surrounding the autonomous vehicle and output sensor data; and an electronic processor configured to receive user input activating an AVP mode of the autonomous vehicle, in response to activation of the AVP mode, detect, based on the sensor data, a guideline along a first aisle of a parking lot, control the autonomous vehicle to travel along the guideline of the first aisle, determine that the autonomous vehicle has reached a first intersection by detecting, based on the sensor data, a first stop line projected across the first aisle, wherein the first intersection does not include a guideline, in response to detecting the first stop line, control the autonomous vehicle to stop in the first aisle at the first intersection, detect a deactivation of the first stop line and a projection of a first guideline connector through the first intersection, the first guideline connector connecting the guideline of the first aisle to a guideline of a second aisle in a predetermined direction, control the autonomous vehicle to travel along the first guideline connector and along the guideline of the second aisle, detect, while travelling along the guideline of the second aisle, an available parking space, and in response to detecting the available parking space, control the autonomous vehicle to park in the available parking space.

17. The AVP system of claim 16, wherein the electronic processor is configured to at the first intersection, detect a projection of a second guideline connector through the first intersection, the second guideline connector connecting the guideline of the first aisle to a guideline of a third aisle in a direction of an exit of the parking lot, the first guideline connector being projected in a different color than the second guideline connector, and control the autonomous vehicle to travel along the first guideline connector or the second guideline connector based on a determination of whether the AVP system is executing an exit command or a parking command.

18. The AVP system of claim 16, wherein the electronic processor is further configured to receive an exit command from a remote server that provides an AVP mobile application to a mobile device associated with the autonomous vehicle, in response to receiving the exit command, control the autonomous vehicle to exit a parking space and travel along the guideline of the second aisle, in response to detecting, based on the sensor data, that the autonomous vehicle has reached a predefined exit area, identify an exit area parking space in the predefined exit area, and control the autonomous vehicle to park in the exit area parking space.

19. An autonomous valet parking (AVP) server for a parking lot, the AVP server comprising:

an electronic processor configured to detect, based on sensor data received from a plurality of object detection sensors in the parking lot, that an autonomous vehicle is travelling along a guideline of a first aisle in the parking lot, control a first light projector located at a first intersection of the parking lot to project a first stop line across the first aisle at the first intersection, wherein detection of the first stop line causes the autonomous vehicle to stop at the first intersection, detect that the autonomous vehicle is stopped at the first intersection of the parking lot based on image data received from an image sensor located at the first intersection, in response to detecting that the autonomous vehicle is stopped at the first intersection, select a direction for guiding the autonomous vehicle to an available parking space, and control the first light projector located at the first intersection to project a first guideline connector that connects the guideline of the first aisle to a guideline of a second aisle in the selected direction, wherein detection of the first guideline connector by the autonomous vehicle causes the autonomous vehicle to travel along the first guideline connector to the second aisle.

* * * * *